US008446999B2

(12) United States Patent
Nakamura et al.

(10) Patent No.: US 8,446,999 B2
(45) Date of Patent: May 21, 2013

(54) RECEIVING APPARATUS AND COMMUNICATION SYSTEM

(75) Inventors: Osamu Nakamura, Osaka (JP); Toshizo Nogami, Osaka (JP); Ryota Yamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 308 days.

(21) Appl. No.: 12/988,252

(22) PCT Filed: Apr. 13, 2009

(86) PCT No.: PCT/JP2009/057432
§ 371 (c)(1),
(2), (4) Date: Nov. 9, 2010

(87) PCT Pub. No.: WO2009/128417
PCT Pub. Date: Oct. 22, 2009

(65) Prior Publication Data
US 2011/0044382 A1    Feb. 24, 2011

(30) Foreign Application Priority Data

Apr. 18, 2008   (JP) ................................. 2008-109295

(51) Int. Cl.
*H04B 7/10* (2006.01)
(52) U.S. Cl.
USPC ........................................................ 375/347
(58) Field of Classification Search
USPC .................................................. 375/347, 229
See application file for complete search history.

(56) References Cited

U.S. PATENT DOCUMENTS 7,317,770 B2 * 1/2008 Wang ............................ 375/340
7,729,443 B2 * 6/2010 Fukuoka et al. ............... 375/295
8,027,402 B2 * 9/2011 Lee et al. ....................... 375/267
2004/0062302 A1 * 4/2004 Fujii et al. ..................... 375/232
2005/0025262 A1   2/2005 Tanabe et al.
2008/0292017 A1  11/2008 Wetzker et al.
2009/0125793 A1   5/2009 Kishigami et al.

FOREIGN PATENT DOCUMENTS

CN    1968044 A    5/2007
JP    2001-308763 A    11/2001
JP    2002-77013 A    3/2002

(Continued)

OTHER PUBLICATIONS

Matsumoto et al., "Turbo Equalization: Fundamentals and Information Theoretic Considerations", IEEE, vol. J90-B, No. 1, 2007, pp. 1-16.

*Primary Examiner* — Juan A Torres
(74) *Attorney, Agent, or Firm* — Birch, Stewart, Kolasch & Birch, LLP

(57) ABSTRACT

A receiving antenna diversity effect is improved by equalizing the likelihood while exchanging the likelihood among a plurality of equalizers. A receiving apparatus (300) which receives radio signals using antennas (301-1 to 301-M), includes: pilot separation sections (304-1 to 304-M) separating a pilot signal and a received data signal from the radio signals; a channel estimation section (305) calculating a channel estimation value corresponding to each of the antennas (301-1 to 301-M) according to the pilot signal; and a reception processing section (306) performing signal detection for the received data signal corresponding to each of the antennas (301-1 to 301-M) and having a plurality of equalization sections each generating likelihood information according to the received data signal and the channel estimation value, wherein any one of the equalization sections generates likelihood information using the likelihood information generated by another equalization section and also outputs the generated likelihood information to another equalization section.

12 Claims, 14 Drawing Sheets

FOREIGN PATENT DOCUMENTS

| | | |
|---|---|---|
| JP | 2004-166218 A | 6/2004 |
| JP | 2005-27179 A | 1/2005 |
| JP | 2008-503955 A | 2/2008 |
| WO | WO 2007/135964 A1 | 11/2007 |

* cited by examiner

RECEIVING APPARATUS AND COMMUNICATION SYSTEM

TECHNICAL FIELD

The present invention relates to a receiving apparatus which receives radio signals using a plurality of antennas and a communication system.

BACKGROUND ART

Conventionally, there has been known a turbo receiver for a single user as shown in Non-patent document 1. FIG. 13 is a diagram showing a schematic configuration of a transmitter and a receiver disclosed in Patent document 1. In a transmitter 1300, an information sequence is coded in an coder 1301 and a coding output thereof is interleaved (rearranged) in an interleaver 1302. After that, a carrier wave signal is modulated in a modulator 1303 and the modulated output is transmitted. This transmission signal is received by a receiver 1310 through a transmission path (each channel of a multipath). In the receiver 1310, a soft-input soft-output equalizer 1311 performs the equalization of a delay wave. The input of this equalizer 1311 is input into the equalizer 1311 as a digital signal of the received signal typically after the received signal has been converted into a base band and the baseband received signal has been converted into a digital signal by sampling at a frequency not less than one time the symbol signal frequency for the information sequence of the transmission signal.

The equalizer 1311 is a linear equalizer and a log-likelihood ratio $\Lambda_1$(LLR), which is a probability ratio of +1 and −1 at each coding bit {b(i)}, is derived as an equalization output. Here, $\lambda_1[b(k)]$ is external information to be transmitted to a succeeding channel decoder 1314, and $\lambda_2[b(k)]$ is preliminary information provided to the equalizer 1311. The preliminary information $\lambda_2[b(k)]$ is subtracted from the LLR in a subtractor 1312 and the subtracted LLR is supplied to the channel decoder 1314 further via a de-interleaver 1313. This channel decoder 1314 calculates a log-likelihood ratio $\Lambda_2$. Here, $\lambda_2[b(i)]$ is external information to be provided to the equalizer 1311 for repetition as $\lambda_2[b(k)]$, and $\lambda_1[b(k)]$ is provided to the channel decoder 1314 as preliminary information $\lambda_1[b(i)]$. $\lambda_1[b(i)]$ is subtracted from $\lambda_2[b(i)]$ in a subtractor 1315 and the subtracted $\Lambda_2[b(i)]$ is supplied to the equalizer 1311 and the subtractor 1312 via an interleaver 1316. In this manner, the equalization and the decoding are performed repeatedly, thereby achieving the improvement of an error rate.

Further, conventionally there has been known receiving antenna diversity. FIG. 14 is a diagram showing a schematic configuration of a receiver disclosed in Patent document 2. This receiver is configured so as to obtain a receiving antenna diversity effect by combining diversity and adaptive equalization and by carrying out antenna synthesis for filter outputs at respective receiving antennas when performing single carrier transmission. As shown in FIG. 14, this receiver includes correlators 1401 and 1402 each estimating an impulse response by correlation calculation of a received signal and a reference signal, and adaptive filters 1403 and 1404 each performing matched filtering based on a weight coefficient of complex conjugate time reversal in the impulse response. This receiver further includes a synthesis circuit 1405 combining filter outputs, a delayed decision feedback sequence estimator 1406 outputting temporary decision data based on an output of the synthesis circuit 1405, a replica generator 1407 generating a received signal replica based on the temporary decision data, a preamble generation circuit 1408 generating a known signal, and switchers 1409 and 1410 supplying the received signal replica or the known signal to the correlators 1401 and 1402, respectively, as the reference signal. Moreover, this receiver includes a receiving units 1411 and 1412 and delay circuits 1413 and 1414.

Prior Art Document
Patent Document
Patent document 1: Japanese Patent Application Laid-Open Publication No. 2004-166218
Patent document 2: Japanese Patent Application Laid-Open Publication No. 2001-308763
Non-patent Document
Non-patent document 1: Tadashi Matsumoto and Shinsuke Ibi "Turbo Equalization Fundamentals and Information Theoretic Considerations", IEICE Trans. B, Vol. J90-B, No. 1, pp. 1-16, 2007

DISCLOSURE OF THE INVENTION

Problem to be Solved by the Invention

As described above, for applying the receiving antenna diversity to the turbo equalization, the antenna synthesis is performed and the log-likelihood ratio is output after equalization has been carried out in each antenna equalization unit (equalizer). However, in the linear processing antenna synthesis, there has been a problem that although a processing amount is small, a performance improvement effect is also small accordingly.

The present invention has been achieved in view of such a situation, and aims at providing a receiving apparatus and a communication system which can improve the receiving antenna diversity effect by equalizing the likelihood while exchanging the likelihood among a plurality of equalizers.

Means for Solving the Problem (1) For achieving the above object, the present invention provides a means as follows. That is, the receiving apparatus of the present invention is a receiving apparatus which receives radio signals using a plurality of antennas, the apparatus comprising: a pilot separation section separating a pilot signal and a received data signal from the radio signals; a channel estimation section calculating a channel estimation value corresponding to each of the antennas according to the pilot signal; and a reception processing section performing signal detection for the received data signal corresponding to each of the antennas and having a plurality of equalization sections each generating likelihood information according to the received data signal and the channel estimation value, wherein any one of the equalization sections generates likelihood information using the likelihood information generated by another equalization section and also outputs the generated likelihood information to another equalization section.

In this manner, any one of the equalization sections generates likelihood information using the likelihood information generated by another equalization section and also outputs the generated likelihood information to another equalization section, and thereby it becomes possible to improve the receiving diversity effect compared to the linear processing antenna synthesis.

(2) In the receiving apparatus of the present invention, the reception processing section includes a first subtraction section subtracting the likelihood information generated by another equalization section from the likelihood information output from the any one of the equalization sections.

In this manner, since from the likelihood information output from any one of the equalization sections, the likelihood information generated by another equalization section is subtracted, it is possible to output only the likelihood information generated by the equalization section itself while utilizing the likelihood information generated by another equalization section.

(3) In the receiving apparatus of the present invention, the reception processing section includes a first decoding section performing decoding processing using the likelihood information output from any one of the equalization sections and outputting the decoded likelihood information.

In this manner, since the decoding processing is performed using the likelihood information output from any one of the equalization sections and the decoded likelihood information is output, it becomes possible to improve the receiving diversity effect.

(4) In the receiving apparatus of the present invention, each of the equalization sections includes: an interference replica generation section generating an interference replica using the received data signal corresponding to each of the antennas, the channel estimation value, and the likelihood information generated by another equalization section; and an interference elimination section subtracting the interference replica from the received data signal corresponding to each of the antennas.

In this manner, since an interference replica is generated and the interference replica is subtracted from the received data signal corresponding to each of the antennas, it becomes possible to minimize the influence of interference.

(5) In the receiving apparatus of the present invention, any one of the equalization sections performs processing of generating likelihood information using the likelihood information generated by another equalization section and outputting the generated likelihood information to another equalization section, at least once.

In this manner, since anyone of the equalization sections performs the processing of generating likelihood information using the likelihood information generated by another equalization section and outputting the generated likelihood information to another equalization section, at least once, it becomes possible to exchange the likelihood information among the plurality of equalization sections and to improve the receiving antenna diversity effect.

(6) In the receiving apparatus of the present invention, the number of times for any one of the equalization sections to perform the processing of generating likelihood information using the likelihood information generated by another equalization section and outputting the generated likelihood information to another equalization section, is determined according to Quality of Service (QoS).

In this manner, since the number of times for any one of the equalization sections to perform the processing of generating likelihood information using the likelihood information generated by another equalization section and outputting the generated likelihood information to another equalization section, is determined according to QoS, it is possible to reduce the number of the processing times or to increase the number of the processing times according to QoS.

(7) In the receiving apparatus of the present invention, the reception processing section further includes an equalization order determination section measuring received quality of each of the received data signals according to the channel estimation value corresponding to each of the antennas, and performing selection of the received data signals to be subjected to signal detection and ordering of the received data signals to be subjected to signal detection.

In this manner, since according to the channel estimation value corresponding to each of the antennas, the received quality of each of the received data signals is measured, and the selection of the received data signals to be subjected to the signal detection and the ordering of the received data signals to be subjected to the signal detection are performed, it becomes possible to carry out the processing in the order of the better channel, for example.

(8) In the receiving apparatus of the present invention, the equalization order determination section changes the number of the received data signals to be selected and the order of the received data signals to be subjected to signal detection, every time any one of the equalization sections repeats the processing of generating likelihood information using the likelihood information generated by another equalization section and outputting the generated likelihood information to another equalization section.

In this manner, since the number of the received data signals to be selected and the order of the received data signals to be subjected to the signal detection are changed every time any one of the equalization sections repeats the processing of generating likelihood information using the likelihood information generated by another equalization section and outputting the generated likelihood information to another equalization section, it becomes possible to perform each processing by determining the best order for each processing (9) In the receiving apparatus of the present invention, the reception processing section further includes a second decoding section performing decoding processing using the likelihood information output from any one of the equalization sections and outputting the decoded likelihood information; and the equalization section generates likelihood information using the likelihood information output from the second decoding section and also outputs the generated likelihood information to the second decoding section.

In this manner, since likelihood information is generated using the likelihood information output from the second decoding section and also the generated likelihood information is output to the second decoding section, not only the likelihood information after each of the antennas has been equalized within the equalization section is exchanged but also the likelihood information can be exchanged including the likelihood information output from the second decoding section, and it becomes possible to improve the receiving antenna diversity effect and the decoding effect.

(10) In the receiving apparatus of the present invention, the reception processing section still further includes a switching section selecting and outputting either one of the likelihood information output from the another equalization section and the likelihood information output from the second decoding section.

In this manner, since either one of the likelihood information output from another equalization section and the likelihood information output from the second decoding section is selected and output, not only the likelihood information after each antenna has been equalized within the equalization section is exchanged but also the likelihood information can be exchanged including the likelihood information output from the second decoding section. As a result, it becomes possible to improve the receiving antenna diversity effect and the decoding effect.

(11) The communication system of the present invention is a communication system which performs radio communication between a transmission apparatus and a receiving apparatus having a plurality of antennas, wherein the receiving apparatus includes: a pilot separation section separating a pilot signal and a received data signal from radio signals received from the transmission apparatus using the plurality of antennas; a channel estimation section calculating a channel estimation value corresponding to each of the antennas according to the pilot signal; and a reception processing section performing signal detection for the received data signal corresponding to each of the antennas and having a plurality of equalization sections each generating likelihood information according to the received data signal and the channel estimation value; and any one of the equalization sections generates likelihood information using the likelihood information generated by another equalization section and also outputs the generated likelihood information to another equalization section.

In this manner, since anyone of the equalization sections generates likelihood information using the likelihood information generated by another equalization section and also outputs the generated likelihood information to another equalization section, it becomes possible to improve the receiving diversity effect compared to the linear processing antenna synthesis.

Advantage of the Invention

According to the present invention, since any one of the equalization sections generates likelihood information using the likelihood information generated by another equalization section and also outputs the generated likelihood information to another equalization section, it becomes possible to improve the receiving diversity effect compared to the linear processing antenna synthesis.

BEST MODES FOR CARRYING OUT THE INVENTION

The present invention is characterized in transmitting the same transmission signal through different channels and equalizing respective signals received via the different channels at a receiver while exchanging the likelihood among a plurality of equalizers on the basis of the concept of turbo decoding. Hereinafter, embodiments of the present invention will be described with reference to the drawings.

(First embodiment)

Figure 1:
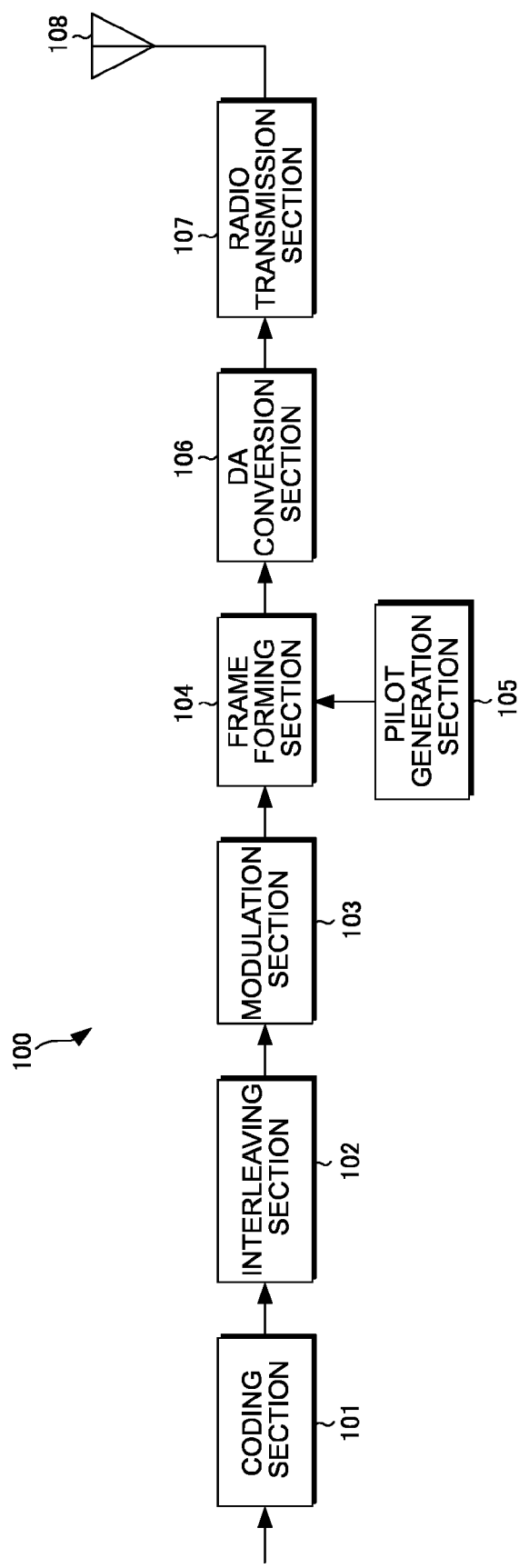
FIG. 1 is a diagram showing a schematic configuration of a transmitter according to a first embodiment.

FIG. 1 is a diagram showing a schematic configuration of a transmitter according to a first embodiment. A transmitter 100 includes an coding section 101, an interleaving section 102, a modulation section 103, a frame forming section 104, a pilot generation section 105, a Digital to Analog (DA) conversion section 106, a radio transmission section 107, and a transmission antenna section 108. The transmitter 100 inputs an information sequence into the coding section 101. The coding section 101 performs error correction coding at a predetermined coding rate using a turbo symbol, an LDPC (Low Density Parity Check) code, or the like and obtains a coding bit sequence.

The coding bit sequence is input into the interleaving section 102. After interleaved in the interleaving section 102, the coding bit sequence is input into the modulation section 103 and modulated to a data symbol sequence by a method such as the BPSK (Binary Phase Shift Keying) or the 16QAM (Quadrature Amplitude Modulation). The data modulation sequence is input into the frame forming section 104. The frame forming section 104 forms a frame using a pilot generated by the pilot generation section 105 and the data symbol sequence input from the modulation section 103.

Figure 2:
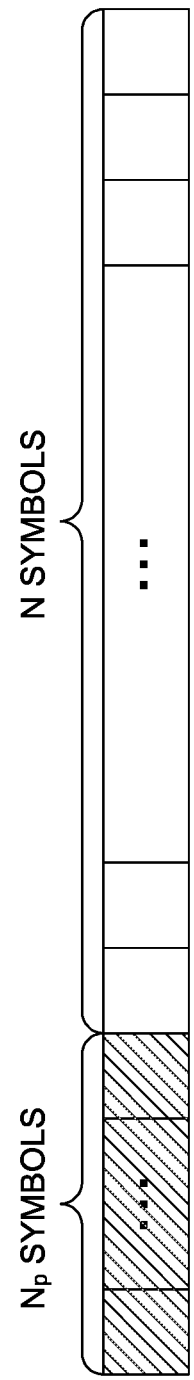
FIG. 2 is a diagram showing an example of a frame structure.

FIG. 2 is a diagram showing an example of a frame structure. The frame forming section 104 adds $N_p$ pilots to the head of the data symbol having N symbols as shown in FIG. 2. The frame generated in the frame forming section 104 is converted into an analog signal in the DA (Digital to Analog) conversion section 106. After that, the analog signal is transmitted from the transmission antenna section 108 via the radio transmission section 107. The signal thus transmitted is received by a receiver.

Figure 3:
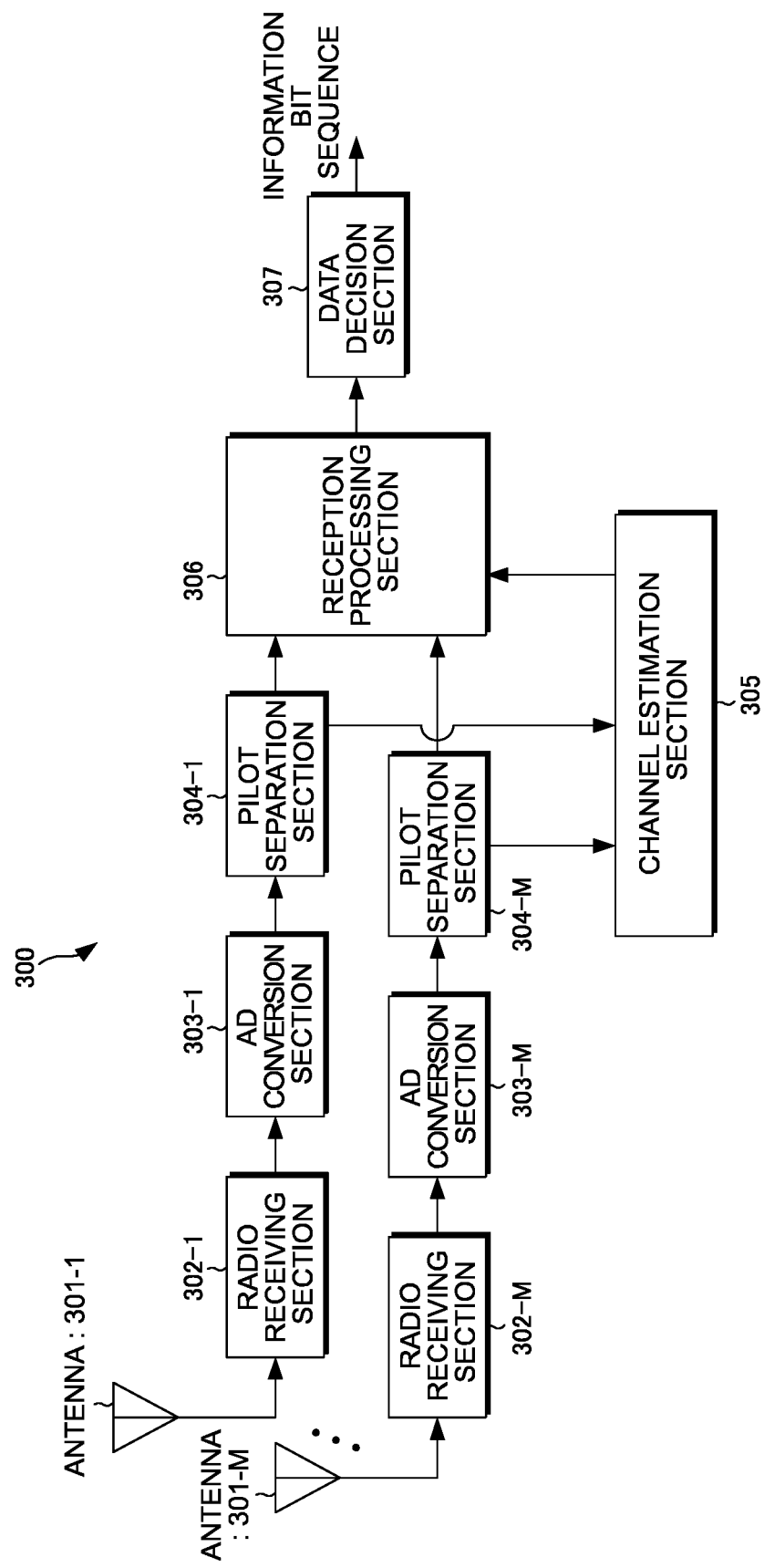
FIG. 3 is a diagram showing a schematic configuration of a receiver according to a first embodiment.

FIG. 3 is a diagram showing a schematic configuration of a receiver according to the first embodiment. The radio signal transmitted from the transmitter shown in FIG. 1 is propagated through a channel to be received by a receiver 300. In the first embodiment, the receiver 300 includes M (M is an integer of two or more) antenna sections 301-1 to 301-M. The receiver further includes radio receiving sections 302-1 to 302-M, Analog to Digital (AD) conversion sections 303-1 to 303-M, pilot separation sections 304-1 to 304-M, a channel estimation section 305, a reception processing section 306, and a data decision section 307.

The signal received by the radio receiving section 302-1 via the antenna section 301-1 is converted into a digital signal in the AD (Analog to Digital) conversion section 303-1. After that, the received signal is separated into a pilot signal and a data signal in the pilot separation section 304-1, and the pilot signal is input into the channel estimation section 305 and the data signal is input into the reception processing section 306. Further, the same processing is performed for the antenna M, and the pilot signal is input into the channel estimation section 305 and the data signal is input into the reception processing section 306. The channel estimation section 305 performs the channel estimation between the transmission antenna section 108 of FIG. 1 and the receiving antenna sections 301-1 to 301-M using the input received pilot signals of the antenna sections 301-1 to 301-M, respectively, and each of the channel estimation values is input into the reception processing section 306.

The reception processing section 306 calculates an coding bit LLR using each of the received data signals of the antennas input from the respective pilot separation sections 304-1 to 304-M and each of the channel estimation values of the antennas input from the channel estimation section 305, and inputs the result into the data decision section 307. The data decision section 307 extracts an information bit LLR from the coding bit LLR and calculates an information bit sequence according to the positive or negative polarity of the bit LLR.

Figure 4:
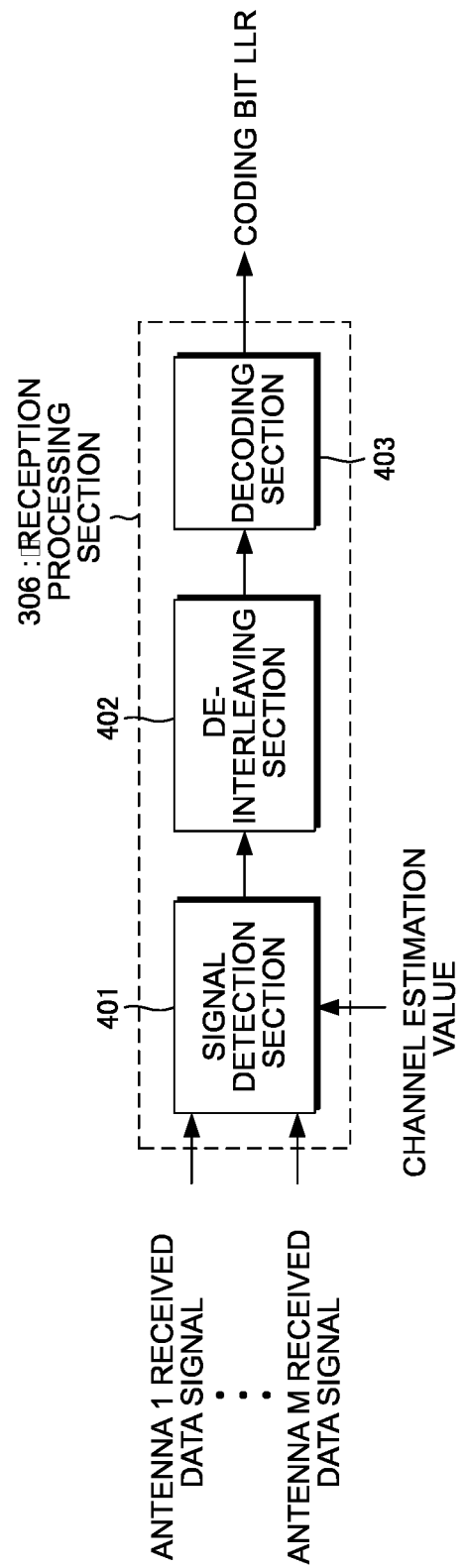
FIG. 4 is a diagram showing a schematic configuration of a reception processing section according to a first embodiment.

Here, the reception processing section 306 according to the first embodiment will be described using FIG. 4. FIG. 4 is a diagram showing a schematic configuration of the reception processing section 306 according to the first embodiment. The reception processing section 306 includes a signal detection section 401, a de-interleaving section 402, and a decoding section 403. The received data signal of each of the antennas and the channel estimation value of each of the antennas are input into the signal detection section 401. The signal detection section 401 calculates the coding bit LLR using the input received data signal of each antenna and the input channel estimation value of each of the antennas. The calculated coding bit LLR is input into the de-interleaving section 402, and, after processing has been performed for returning the interleaving performed in the interleaving section 102 of the transmitter shown in FIG. 1, the result is input into the decoding section 403. The decoding section 403 performs decoding processing corresponding to the coding of the transmitter. The decoding section 403 calculates and outputs the coding bit LLR.

Figure 5:
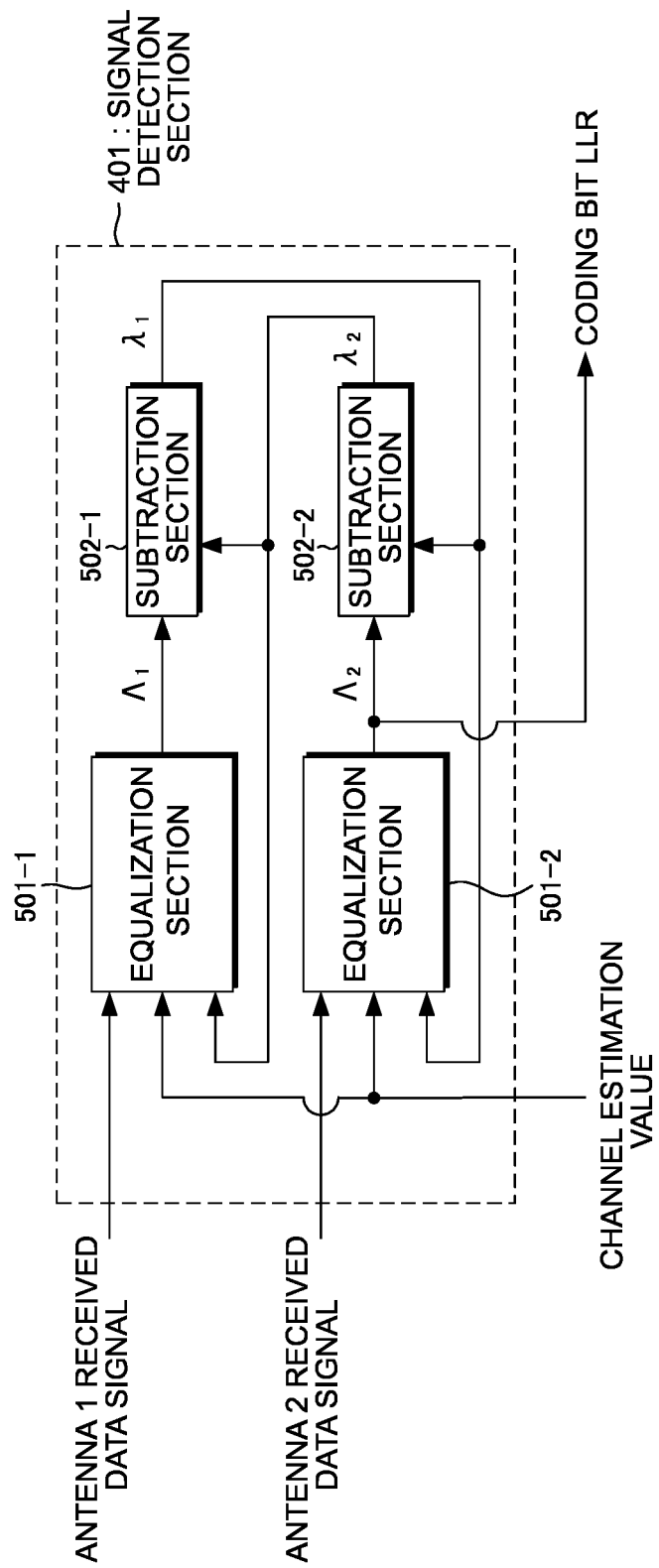
FIG. 5 is a diagram showing a schematic configuration of a signal detection section according to a first embodiment.

Next, a configuration of the signal detection section 401 will be described by the use of FIG. 5. FIG. 5 is a diagram showing a schematic configuration of the signal detection section according to the first embodiment. Note that an example will be explained here for a case in which the number of the receiving antennas is two. The signal detection section 401 includes transmission signal detection sections (equalization sections) 501-1 and 501-2, and subtraction sections 502-1 and 502-2. The equalization section 501-1 inputs the antenna 1 received data signal, a coding bit LLR $\lambda_2$ output from the subtraction section 502-2, and the channel estimation value, and performs equalization processing so as to compensate the multipath and output a coding bit LLR $\Lambda_1$ to the subtraction section 502-1. Note that the output $\lambda_2$ of the subtraction section 502-2 does not exist at the first time and thus $\lambda_2$ is provided with zero. The subtraction section 502-1 performs subtraction processing of $\Lambda_1-\lambda_2$ using the input coding bit LLR $\Lambda_1$ output from the equalization section 501-1 and the coding bit LLR $\lambda_2$ output from the subtraction section 502-2 and obtains the output coding bit LLR $\lambda_1$. The obtained $\lambda_1$ is output to the equalization section 501-2 and the subtraction section 502-2.

The equalization section 501-2 performs the equalization processing so as to compensate the multipath using the antenna 2 received data signal, the coding bit LLR $\lambda_1$ output from the subtraction section 502-1, and the channel estimation value in each of the receiving antennas, and inputs the coding bit LLR $\Lambda_2$ into the subtraction section 502-2. The subtraction section 502-2 performs subtraction processing of $\Lambda_2-\lambda_1$ using the input coding bit LLR $\Lambda_2$ output from the equalization section 501-2 and the coding bit LLR $\lambda_1$ output from the subtraction section 502-1, and obtains the coding bit LLR $\lambda_2$. The obtained $\lambda_2$ is input into the equalization section 501-1 and the subtraction section 502-1. The above processing is repeated once or more, and the coding bit LLR $\Lambda_2$ output from the equalization section 501-2 is input into the de-interleaving section 402 of FIG. 5. Note that, while the coding bit LLR $\Lambda_2$ output from the equalization section 501-2 is made the final output in FIG. 5, the coding bit LLR $\Lambda_1$ output from the equalization section 501-1 may be made the final output.

Figure 6:
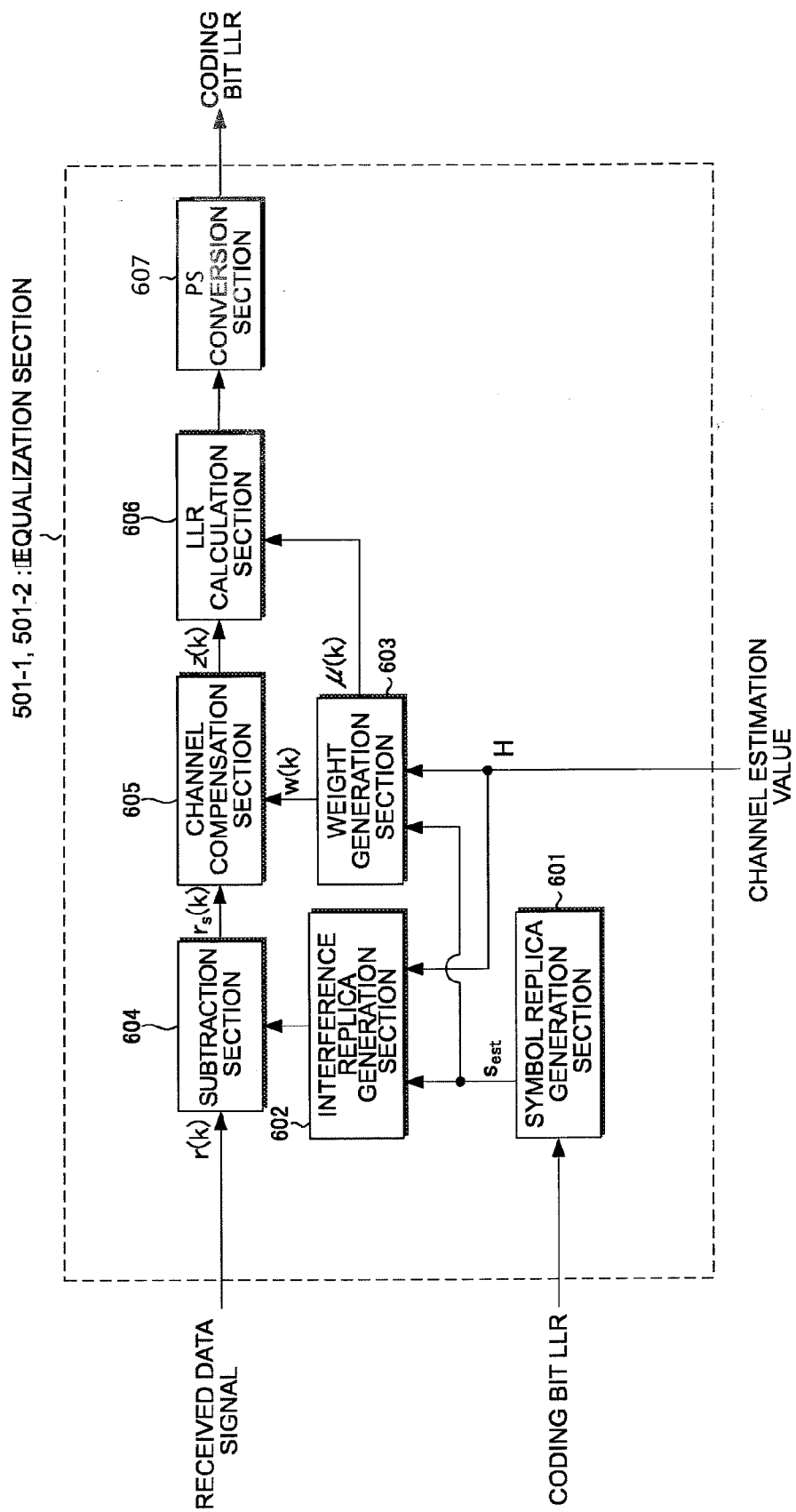
FIG. 6 is a diagram showing a schematic configuration of an equalization section 501-1 or 501-2.

Next, the equalization sections 501-1 and 501-2 will be explained by the use of FIG. 6. FIG. 6 is a diagram showing a schematic configuration of the equalization section 501-1 or 501-2. Here, the equalization for the kth symbol will be explained. An input coding bit LLR sequence is input into a symbol replica generation section 601. The symbol replica generation section 601 generates a symbol replica $s_{est}$ ((2L−1)×1 vector) except the kth symbol by Formula (1) using the input coding bit LLR sequence.

[Formula 1]

$$s_{est} = \tanh[\Lambda/2] \quad (1)$$

The calculated symbol replica $s_{est}$ is input into an interference replica generation section 602 and a weight generation section 603. Further, an input channel estimation value H (L×(2L−1) matrix, L: number of paths of the channel) is also input into the interference replica generation section 602 and the weight generation section 603. Here, H is a matrix representing the whole temporal and spatial structure of the channel. The interference replica generation section 602 generates an interference replica using the input symbol replica $s_{est}$ and the channel estimation value H and inputs the result into the subtraction section 604. Further, a received data signal r(k) (L×1 vector) is input into the subtraction section 604. Meanwhile, the weight generation section 603, into which the symbol replica $s_{est}$ (vector) and the channel estimation value have been input, calculates a channel compensation weight w(k) (L×1 vector) and an equivalent gain μ(k), and inputs the channel compensation weight w(k) (vector) into a channel compensation section 605 and inputs the equivalent gain μ(k) into an LLR calculation section 606. Here, the channel compensation weight w(k) (vector) and the equivalent gain μ(k) are calculated from Formulas (2) and (3), respectively.

[Formula 2]

$$w(k) = [H\Lambda H^H + \sigma^2 I]^{-1} He_L \quad (2)$$

[Formula 3]

$$\mu(k) = e_L^T H^H [H\Lambda H^H + \sigma^2 I]^{-1} He_L \quad (3)$$

Here, $\sigma^2$ is noise variance, I is an L×L unit matrix, $e_L$ is (2L−1)×1 vector in which the Lth element is one and the other elements are zero, T indicates transposition, and H indicates complex conjugate transposition (Hermite transposition). Further, $\Lambda(k)$ ((2L−1)×(2L−1) matrix) is expressed by the following formula.

[Formula 4]

$$\Lambda(k) = diag(1-s_{est}^2(k+L-1), \ldots, 1-s_{est}^2(k+1), 1, 1-s_{est}^2(k-1), \ldots, 1-s_{est}^2(k-L+1)) \quad (4)$$

Here, diag (x) means a diagonal matrix having a vector x as a diagonal element. Meanwhile, the received data signal r(k) (L×1 vector) is input into the subtraction section 604. The subtraction section 604 subtracts the interference replica (multiplication of H and $S_{est}$) from the received data signal r (vector) and obtains a signal $r_s(k)$ (L×1 vector) in which interference is suppressed. The obtained $r_s(k)$ (vector) is input into the channel compensation section 605. The channel compensation section 605 performs the processing of Formula (5) and inputs a signal z(k) after the compensation into an LLR calculation section 606.

[Formula 5]

$$z(k) = w^H(k) r_s(k) \quad (5)$$

The LLR calculation section 606 obtains the coding bit LLR from Formula (6) using the input signal z(k) after the compensation and the equivalent gain μ(k).

[Formula 6]

$$\Lambda(k) = \frac{4\operatorname{Re}[z(k)]}{1 - \mu(k)} \quad (6)$$

Here, Re[] indicates processing of taking out only a real part. The above processing is performed on N symbols and the calculated coding bit LLR is input into a PS conversion section 607. The Parallel to Serial (PS) conversion section 607 performs PS (Parallel-Serial) conversion on the input coding bit LLR and outputs the coding bit LLR. Note that, while the configuration of the equalization section 501-1 or 501-2 is described in Non-patent document 1, any configuration may be used if the multipath is compensated and the coding bit LLR is output.

As described above, the first embodiment performs the equalization processing for each of the antennas and exchanges the coding bits LLR after the equalization among the antennas without performing the linear antenna synthesis, and thereby can improve the receiving antenna diversity effect.

(Second Embodiment)

A second embodiment performs the equalization while exchanging the likelihood between the receiving antenna equalizers when the receiver has three or more receiving antennas. A transmitter configuration may be the same as that of the first embodiment shown in FIG. 1. A signal transmitted from the transmitter shown in FIG. 1 is received by a receiver through a channel.

FIG. 3 is a diagram showing a schematic configuration of a receiver according to the second embodiment. In the second embodiment, a receiver 300 includes M (M is an integer of three or more) antennas 301-1 to 301-M. Further, the receiver 300 includes radio receiving sections 302-1 to 302-M, AD conversion sections 303-1 to 303-M, pilot separation sections 304-1 to 304-M, a channel estimation section 305, a reception processing section 306, and a data decision section 307.

The signal received by the radio receiving section 302-1 via the antenna section 301-1 is converted into a digital signal in the AD conversion section 303-1. After that, the received signal is separated into a pilot signal and a data signal in the pilot separation section 304-1, and the pilot signal is input into the channel estimation section 305 and the data signal is input into the reception processing section 306. Further, the same processing is performed also for the antenna M. The pilot signal is input into the channel estimation section 305 and the data signal is input into the reception processing section 306. The channel estimation section 305 performs the estimation of the channels between the transmission antenna section 108 of FIG. 1 and the receiving antenna sections 301-1 to 301-M using the input received pilot signals of the antenna sections 301-1 to 301-M, respectively, and each of the channel estimation values is input into the reception processing section 306. The reception processing section 306 calculates the coding bit LLR using each of the received data signals of the respective antennas input from the pilot separation sections 304-1 to 304-M and each of the channel estimation values of the respective antennas input from the channel estimation section 305, and inputs the result into the data decision section 307. The data decision section 307 extracts the information bit LLR from the coding bit LLR and calculates the information bit sequence according to the positive or negative polarity of the bit LLR.

Here, the reception processing section 306 of the second embodiment will be explained by the use of FIG. 4. The reception processing section 306 includes a signal detection section 401, a de-interleaving section 402, and a decoding section 403. The received data signal of each of the antennas and the channel estimation value of each of the antennas are input into the signal detection section 401. The signal detection section 401 calculates the coding bit LLR using the input received data signal of each of the antennas and the input channel estimation value of each of the antennas. The calculated coding bit LLR is input into the de-interleaving section 402, and, after processing has been performed for returning the interleaving performed in the interleaving section 102 of the transmitter shown in FIG. 1, the result is input into the decoding section 403. The decoding section 403 performs decoding processing corresponding to the coding of the transmitter. The decoding section 403 calculates and outputs the coding bit LLR.

Figure 7:
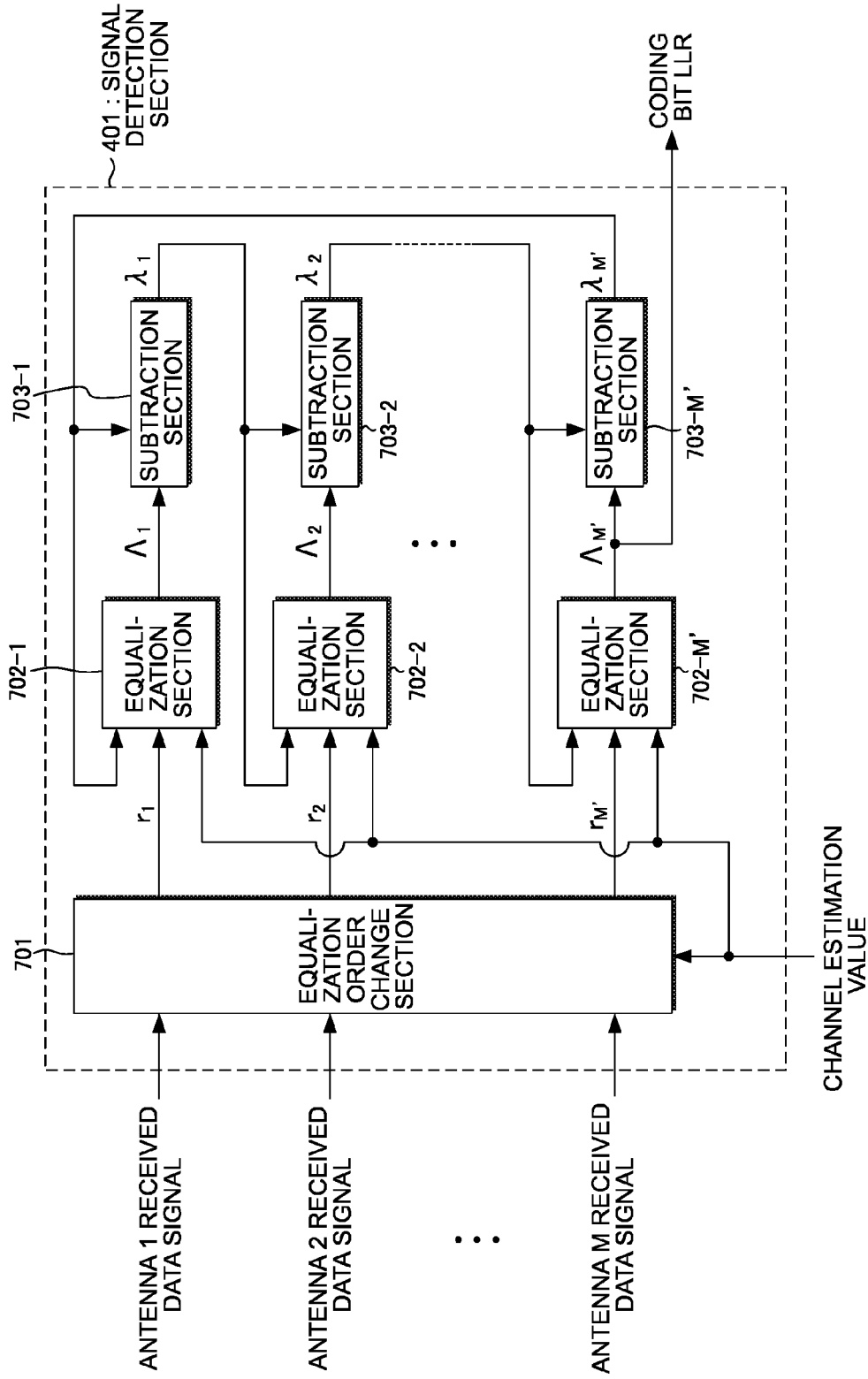
FIG. 7 is a diagram showing a schematic configuration of a signal detection section according to a second embodiment.

Next, a configuration of the signal detection section 401 will be explained by the use of FIG. 7. FIG. 7 is a diagram showing a schematic configuration of the signal detection section according to the second embodiment. The signal detection section 401 includes an equalization order determination section 701, equalization sections 702-1 to 702-M' and subtraction sections 703-1 to 703-M'. The received data signals of the respective antennas 1 to M and channel estimation values of the respective antennas 1 to M are input into the equalization order determination section 701. The equalization order determination section 701 obtains average received quality in each of the antennas, for example, an SNR (Signal-to-Noise power Ratio) or an SINR (Signal-to-Interference plus Noise power Ratio), and determines the number of the received data signals M' (M' is a natural number of M or less) to be subjected to the equalization processing according to the average received quality and determines an order for performing the equalization processing and performs order change. Note that it may not be configured such that the order change needs to be always performed. The equalization order determination section 701 inputs the received data signal to be subjected to the equalization processing and the channel estimation value at first into the equalization section 702-1.

The equalization section 702-1 receives a received data signal $r_1$ which is input from the equalization order determination section 701 and is to be subjected to the equalization processing at first, a coding bit LLR $\lambda_{M'}$ input from the subtraction section 703-M', and the channel estimation value, and performs the equalization processing so as to compensate the multipath and inputs a coding bit LLR $\Lambda_1$ into the subtraction section 703-1. Here, while the configuration of the equalization section 702-1 may be the same as that of the first embodiment, any configuration may be used if the multipath is compensated and the coding bit LLR is output. Note that output $\lambda_{M'}$ of the subtraction section 703-M' does not exist at the first time and thus $\lambda_{M'}$ is provided with zero.

The subtraction section 703-1 performs subtraction processing and obtains an output coding bit LLR $\lambda_1$ using the input coding bit LLR $\Lambda$ output from the equalization section 702-1 and coding bit LLR $\lambda_{M'}$ output from the subtraction section 703-M', and obtains an output coding bit LLR $\lambda_1$. The obtained $\lambda_1$ is output to the equalization section 702-2 and the subtraction section 703-2. The equalization section 702-2 performs the equalization processing so as to compensate the multipath using a received data signal $r_2$ which is input from the equalization order determination section 701 and is to be subjected to the equalization processing secondarily, the coding bit LLR $\lambda_1$ output from the subtraction section 703-1, and the channel estimation value in each of the receiving antennas, and inputs a coding bit LLR $\Lambda$ into the subtraction section 703-2.

The subtraction section 703-2 performs the subtraction processing of $\Lambda_2-\lambda_1$ and obtains a coding bit LLR $\lambda_2$, using the input coding bit LLR $\Lambda_2$ output from the equalization section 702-2 and the coding bit LLR $\lambda_1$ output from the subtraction section 703-1. Such processing is performed up to the M'th received data signal. The output of the equalization section 702-M' which performs the equalization processing at the M'th order is input into the subtraction section 703-M'. The subtraction section 703-M' receives a coding bit LLR $\Lambda_{M'}$ output from the equalization section 702-M' and a coding bit LLR $\lambda_{M'-1}$, and performs the subtraction processing of $\Lambda_{M'}-\lambda_{M'-1}$ to obtain the coding bit LLR $\lambda_{M'}$. $\lambda_{M'}$ output from the subtraction section 703-M' is input into the equalization section 702-1 and the subtraction section 703-1. The above processing is repeated once or more and the coding bit LLR $\Lambda$ is obtained as the output of the equalization section 702-M'.

Figure 8:
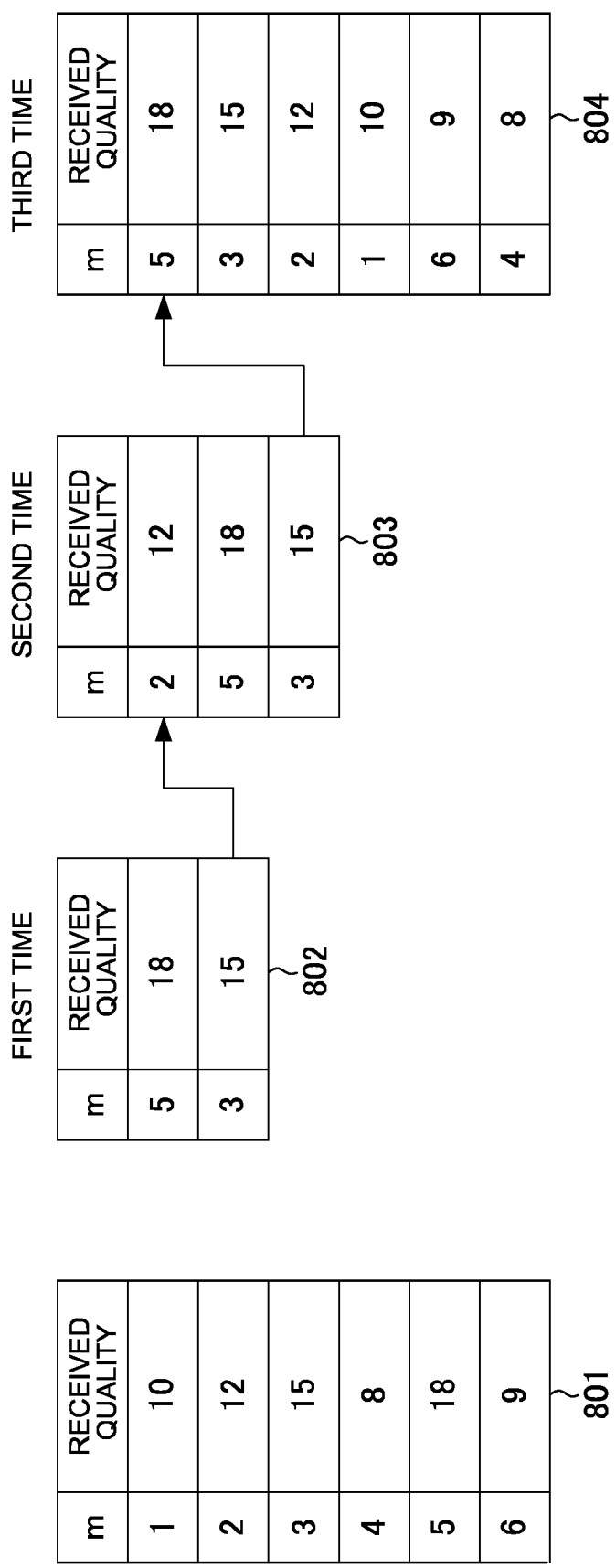
FIG. 8 is a diagram showing received quality of each received data signals.

Further, the number of the received data signals to be subjected to the equalization processing and the order thereof may be different for each repetition. FIG. 8 is a diagram showing the received quality for each of the received data signals. The equalization order determination section 701 shown in FIG. 7 measures the received quality for each of the received data signals such as 801 in FIG. 8 using the channel estimation value. At the first time, the equalization order determination section 701 selects the received data to be subjected to the equalization and performs ordering using the measured received quality. In FIG. 8, the equalization order determination section 701 selects a received data signal 3 and a received data signal 5 and performs the equalization in the order of the received data signal 5 and the received data signal 3 (802).

Next, at the second repetition, the equalization order determination section 701 selects the received data to be subjected to the equalization and performs the ordering. In FIG. 8, the equalization order determination section 701 selects a received data signal 2, the received data signal 3, and the received data signal 5, and performs the equalization in the order of the received data signal 2, the received data signal 5, and the received data signal 3 (803). Here, the coding bit LLR which has been output in the equalization of the received data signal 3 at the first time is used for the equalization of the received data signal 2. Next, the equalization determination change section 701 selects the received data signal to be subjected to the equalization at the third repetition and performs the ordering. In FIG. 8, the equalization order determination section 701 selects all the received data signals and performs the equalization in the order of the received data signals 5, 3, 2, 1, 6 and 4 (804). Here, the coding bit LLR which has been output in the equalization of the received data signal 3 in the second repetition is used for the equalization of the received data signal 5. Note that the number of the received data signals to be subjected to the equalization processing, the number of the repetitions, and the order thereof may be determined in consideration of not only the received quality but also allowable processing delay time and the QoS (Quality of Service) such as allowable communication quality. That is, when the allowable delay time is short, or when the allowable communication quality is low, the number of the received data signals to be subjected to the processing and the number of the repetitions may be limited.

As described above, the second embodiment, also when three or more receiving antennas exist, performs the equalization processing for each of the antennas and can improve the receiving antenna diversity effect greatly by exchanging the coding bits LLR after the equalization among the three or more antennas without performing the linear antenna synthesis.

(Third Embodiment)

A third embodiment improves the bit error rate by exchanging the likelihood among a plurality of equalizers and decoders on the basis of the concept of turbo decoding for signals received by a receiver via different channels when the same transmission signal is propagated through the different channels. A configuration of a transmitter may be the same as that of the first embodiment shown in FIG. 1. A signal transmitted from the transmitter shown in FIG. 1 is propagated through a channel and received by a receiver.

FIG. 4 is a diagram showing a schematic configuration of a receiver according to the third embodiment. In the third embodiment, the receiver includes M (M is an integer of two or more) antenna sections 301-1 to 301-M. Further, the receiver includes radio receiving sections 302-1 to 302-M, AD conversion sections 303-1 to 303-M, pilot separation sections 304-1 to 304-M, a channel estimation section 305, a reception processing section 306, and a data decision section 307.

The signal received by the radio receiving section 302-1 via the antenna section 301-1 is converted into a digital signal in the AD conversion section 303-1. After that, the received signal is separated into a pilot signal and a data signal in the pilot separation section 304-1, and the pilot signal is input into the channel estimation section 305 and the data signal is input into the reception processing section 306. Further, the same processing is performed also for the antenna M, and the pilot signal is input into the channel estimation section 305 and the data signal is input into the reception processing section 306. The channel estimation section 305 performs the estimation of the channels between the transmission antenna section 108 shown in FIG. 1 and the respective receiving antenna sections 301-1 to 301-M using the input received pilot signals of the antenna sections 301-1 to 301-M, respectively, and each of the channel estimation values is input into the reception processing section 306. The reception processing section 306 calculates the coding bit LLR using each of the received data signals of the respective antennas input from the pilot separation sections 304-1 to 304-M and each of the channel estimation values of the respective antennas input from the channel estimation section 305, and inputs the result into the data decision section 307. The data decision section 307 extracts the information bit LLR from the coding bit LLR and calculates the information bit sequence according to the positive or negative polarity of the bit LLR.

Figure 9:
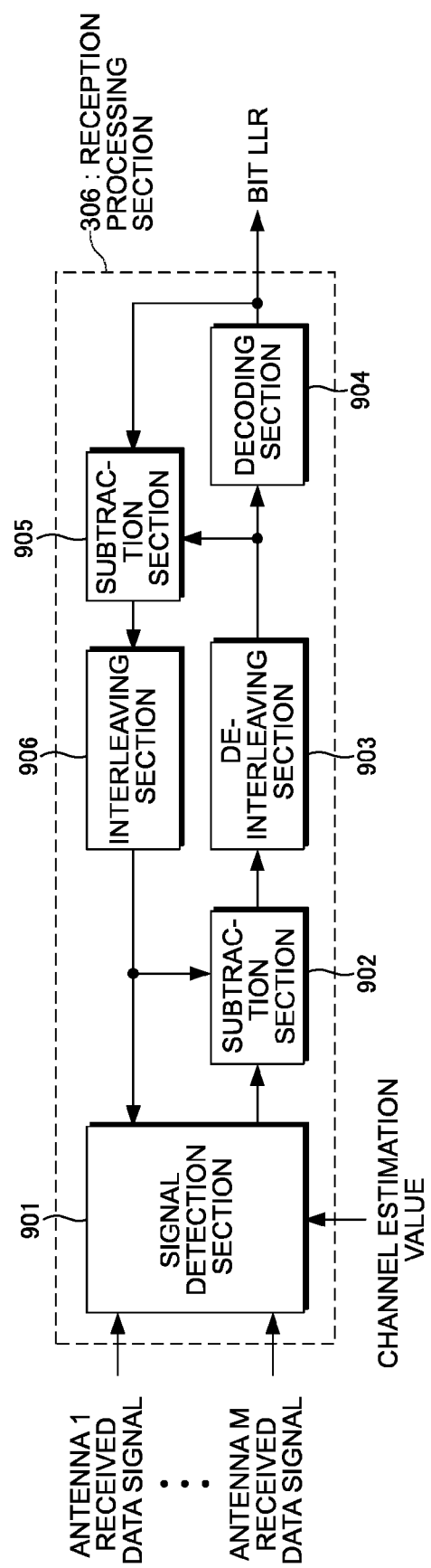
FIG. 9 is a diagram showing a schematic configuration of a reception processing section according to a third embodiment.

Here, the reception processing section 306 of the third embodiment will be explained. FIG. 9 is a diagram showing a schematic configuration of the reception processing section 306 according to the third embodiment. The reception processing section 306 includes a signal detection section 901, a subtraction section 902, a de-interleaving section 903, a decoding section 904, a subtraction section 905, and an interleaving section 906. The received data signal of each of the antennas and the channel estimation value of each of the antennas are input into the signal detection section 901. The signal detection section 901 calculates the coding bit LLR using the input received data signal of each of the antennas, the channel estimation value of each of the antennas, and an input from the interleaving section 906. The calculated coding bit LLR is input into the subtraction section 902.

The subtraction section 902 subtracts the coding bit LLR input by the interleaving section 906 from the coding bit LLR input by the signal detection section 901 and inputs the result into the de-interleaving section 903. The de-interleaving section 903 performs processing of returning the interleaving performed in the interleaving section 102 of the transmitter shown in FIG. 1 and inputs the result into the decoding section 904 and the subtraction section 905. The decoding section 904 performs decoding processing corresponding to the coding in the transmitter. The decoding section 904 inputs the coding bit LLR after the decoding into the subtraction section 905.

The subtraction section 905 subtracts the coding bit LLR input by the de-interleaving section 903 from the coding bit LLR input by the decoding section 904 and inputs the result into the interleaving section 906. The interleaving section 906 performs interleaving the same as that performed in the interleaving section 102 of the transmitter for the input coding bit LLR, and inputs the obtained coding bit LLR into the signal detection section 901 and the subtraction section 902. The above processing is performed repeatedly at least once and the coding bit LLR calculated by the decoding section 904 is output to the data decision section 307.

Figure 10:
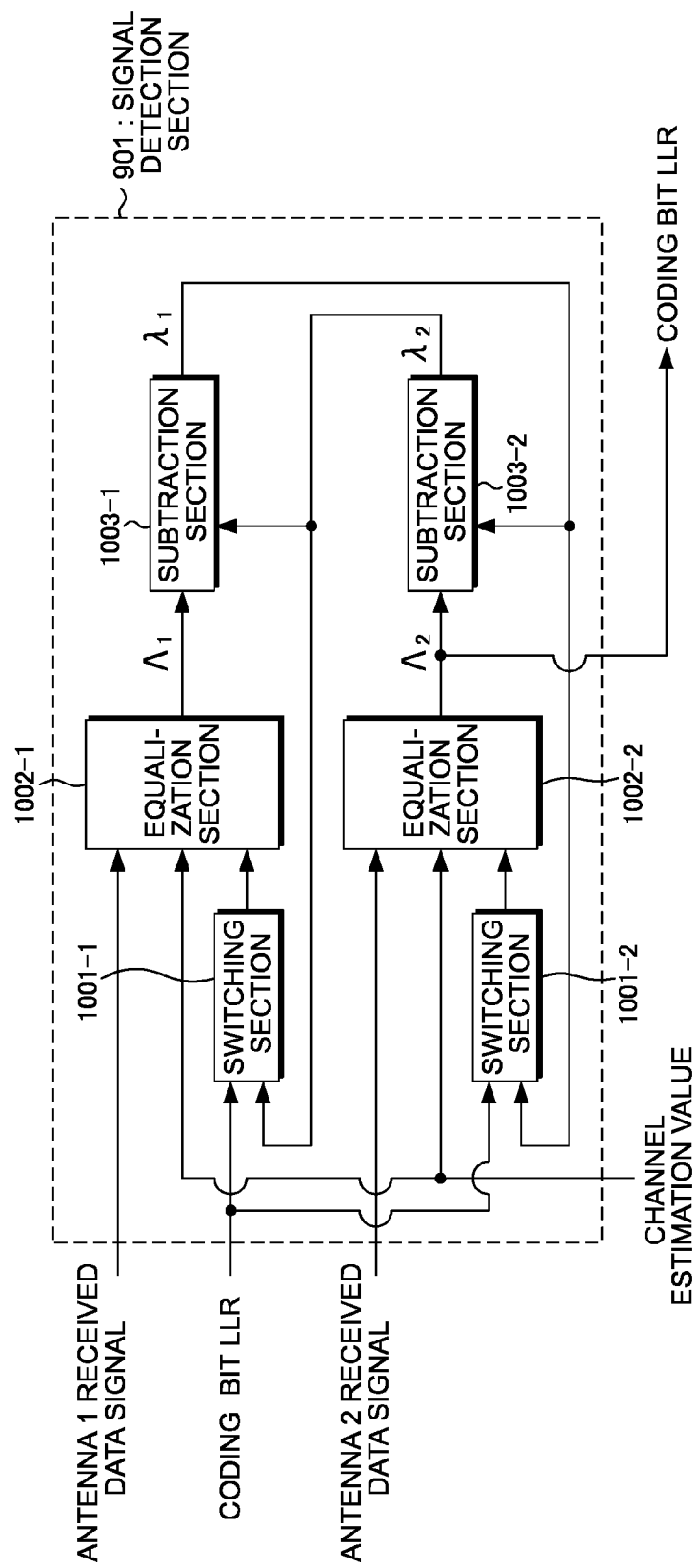
FIG. 10 is a diagram showing a schematic configuration of a signal detection section.

Next, the signal detection section 901 will be explained. FIG. 10 is a diagram showing a schematic configuration of the signal detection section. Note that, in the third embodiment, an example will be explained for a case of two receiving antennas. The signal detection section 901 includes switching sections 1001-1 and 1001-2, equalization sections 1002-1 and 1002-2, and subtraction sections 1003-1 and 1003-2. Note that, while the configuration of the equalization section 1002-1 or 1002-2 may be the same as that of the first embodiment, any configuration may be used if the multipath is compensated and the coding bit LLR is output.

The switching section 1001-1 receives the coding bit LLR output from the interleaving section 906 of FIG. 9 and a coding bit LLR $\lambda_2$ output from the subtraction section 1003-2. The switching section 1001-1 inputs the input from the subtraction section 1003-2 into the equalization section 1002-1 when exchanging the coding bits LLR between the antennas, and inputs the input from the interleaving section 906 of FIG. 9 into the equalization section 1002-1 when exchanging the coding bits LLR between the signal detection section 901 and the decoding section 904 of FIG. 9. Note that, the coding bit LLR output from the interleaving section 906 of FIG. 9 and the coding bit LLR $\lambda_2$ output from the subtraction section 1003-2 do not exist at the first time, and thus each of the input coding bits LLR from the interleaving section 906 of FIG. 9 and $\lambda_2$ is provided with zero.

The equalization section 1002-1 performs the equalization processing so as to compensate the multipath using the received data signal of the antenna 1, the channel estimation value, and the input from the switching section 1001 and inputs a coding bit LLR $\Lambda$ into the subtraction section 1003-1. The subtraction section 1003-1 performs the subtraction processing of $\Lambda - \lambda_2$ and obtains an output coding bit LLR $\lambda_1$ using the input coding bit LLR $\Lambda_1$ output from the equalization section 1002-1 and the coding bit LLR $\lambda_2$ output from the subtraction section 1003-2. The obtained $\lambda_1$ is output to the switching section 1001-2 and the subtraction section 1003-2. The switching section 1001-2 inputs the input from the subtraction section 1003-1 into the equalization section 1002-2 when exchanging the coding bits LLR between the antennas, and inputs the input from the interleaving section 906 of FIG. 9 into the equalization section 1002-2 when exchanging the coding bits LLR between the signal detection section 901 and the decoding section 904 of FIG. 9.

The equalization section 1002-2 performs the equalization processing so as to compensate the multipath using the received data signal of the antenna 2, the output of the switching section 1001-2, and the channel estimation value in each of the receiving antennas, and inputs a coding bit LLR $\Lambda_2$ into the subtraction section 1003-2. The subtraction section 1003-2 performs the subtraction processing of $\Lambda - \lambda_1$ and obtains the coding bit LLR $\lambda_2$ using the input coding bit LLR $\Lambda$ output from the equalization section 1002-2 and the coding bit LLR $\lambda_1$ output from the subtraction section 1003-1. The obtained $\lambda_2$ is input into the switching section 1001 and the subtraction section 1003-1. The above processing is repeated once or more and the coding bit LLR $\Lambda_2$ output from the equalization section 1002-2 is input into the subtraction section 902 of FIG. 9. Note that, while the coding bit LLR $\Lambda_2$ output from the equalization section 1002-2 is made the final output in FIG. 10, the coding bit LLR $\Lambda_1$ output from the equalization section 1002-1 may be made the final output.

Figure 11:
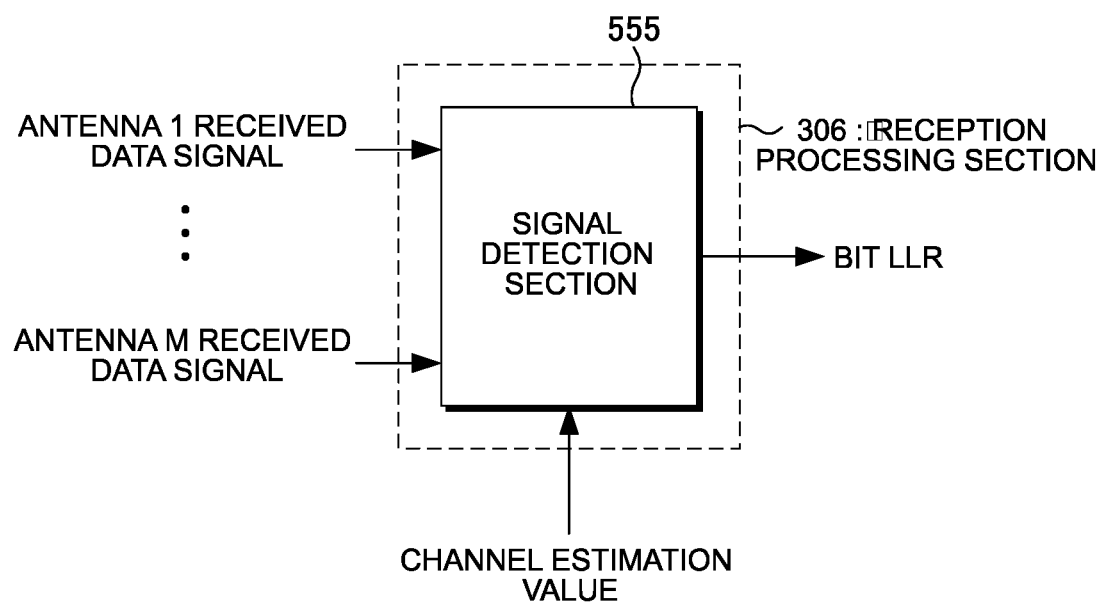
FIG. 11 is a diagram showing a schematic configuration of a reception processing section according to a third embodiment.
Figure 12:
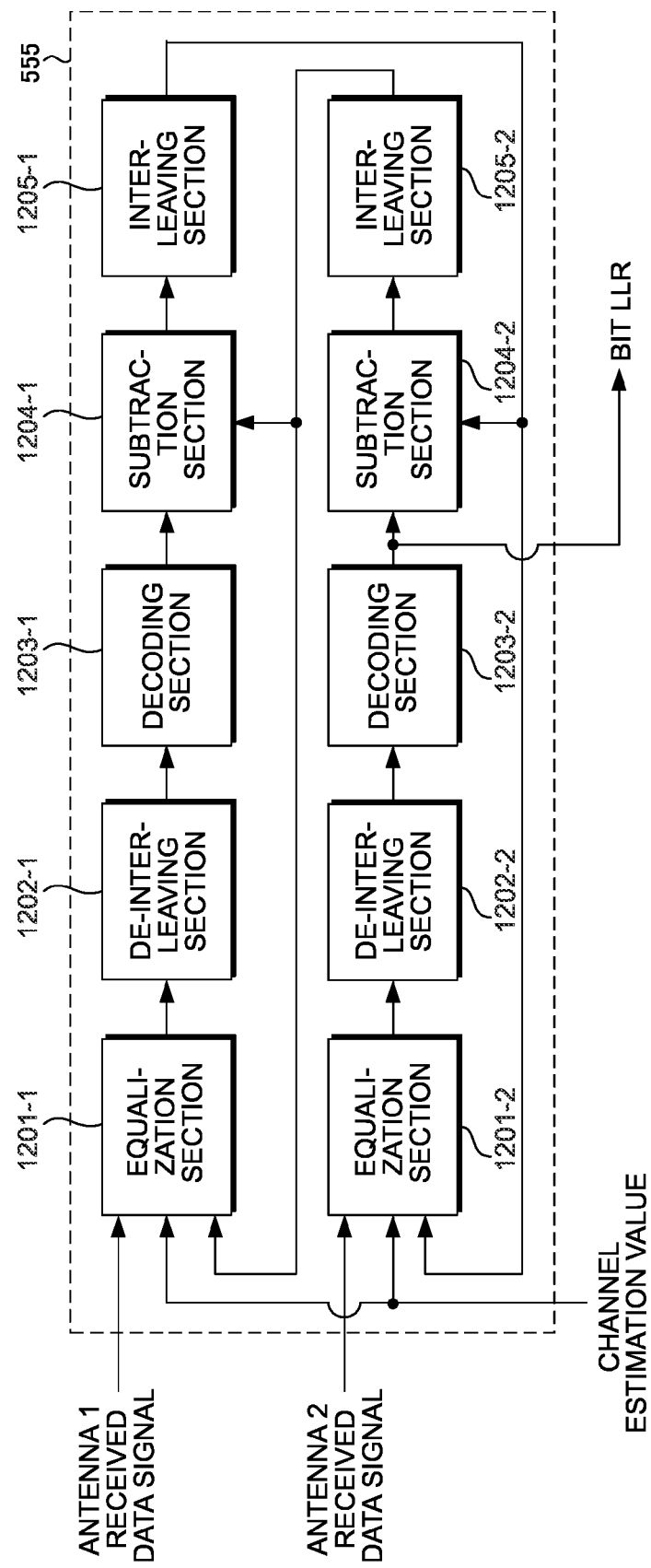
FIG. 12 is a diagram showing a schematic configuration of a signal processing section according to a third embodiment.
Figure 13:
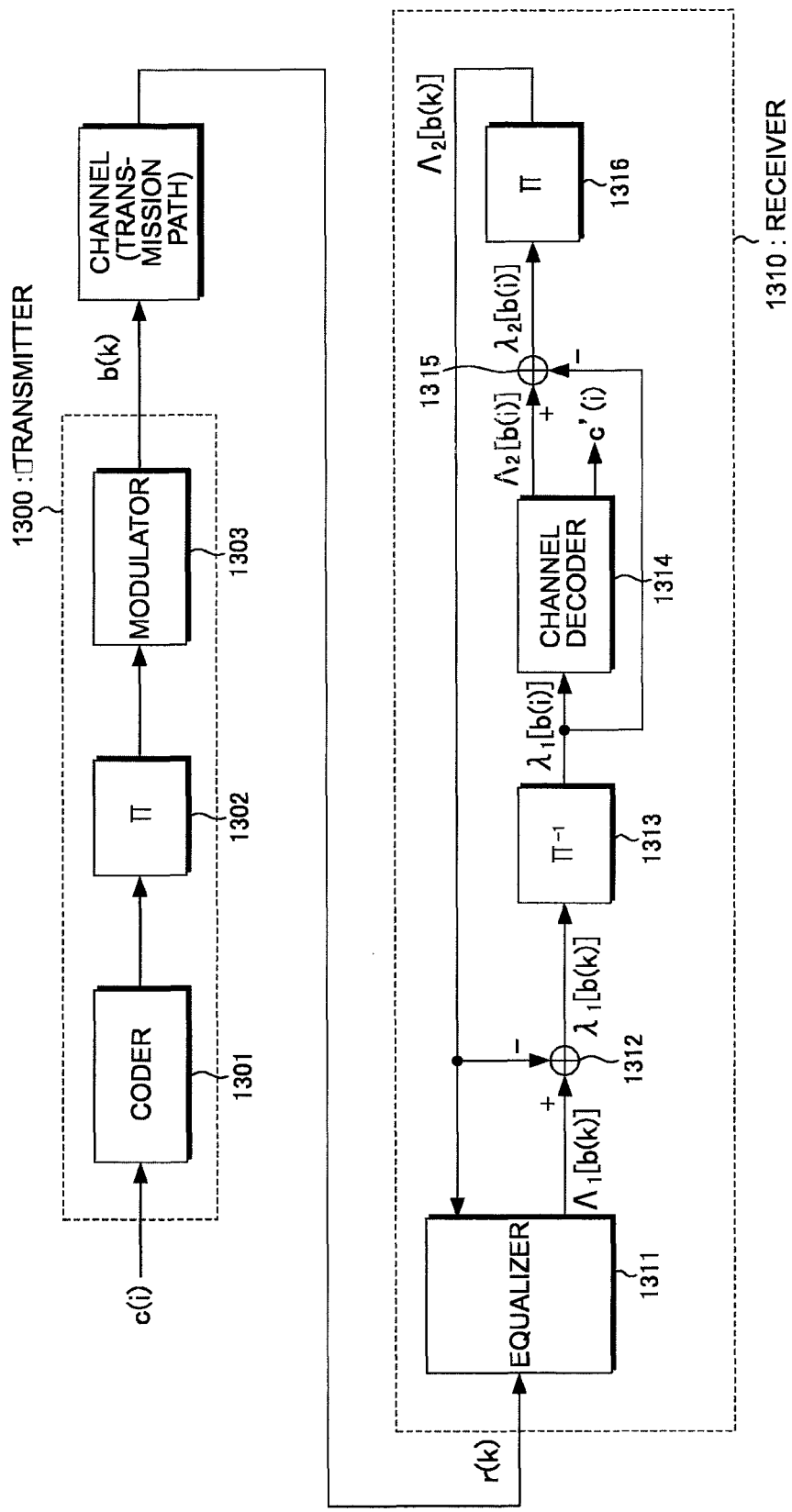
FIG. 13 is a diagram showing a schematic configuration of a transmitter and a receiver described in Patent document 1.
Figure 14:
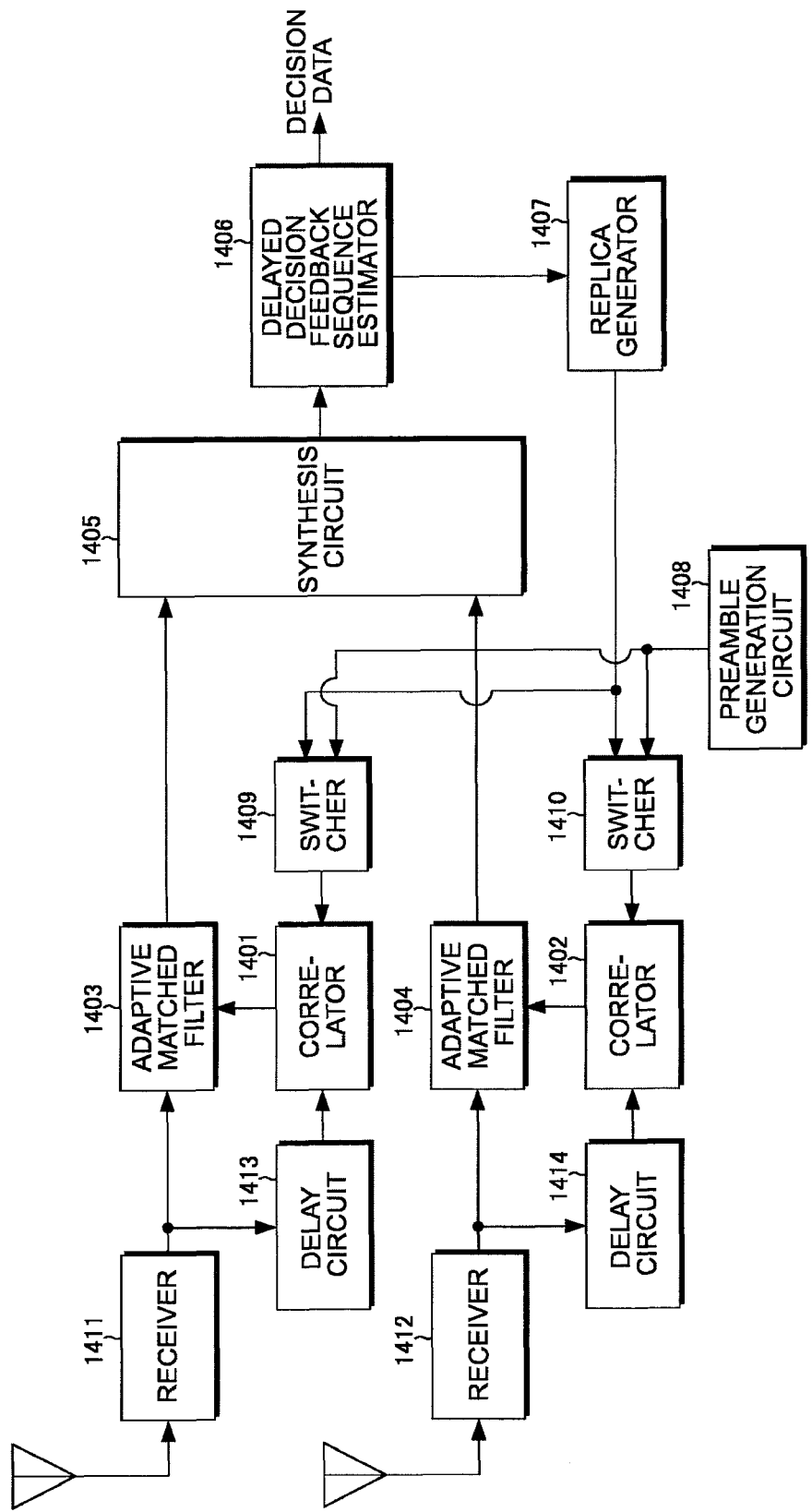
FIG. 14 is a diagram showing a schematic configuration of a receiver described in Patent document 2.

Note that the configuration of the receiving apparatus shown in FIG. 3 may be a configuration having a signal detection section 555 as shown in FIG. 11, not limited to the configuration as shown in FIG. 9. The signal detection section 555 in this case includes equalization sections 1201-1 and 1201-2, de-interleaving sections 1202-1 and 1202-2, decoding sections 1203-1 and 1203-2, subtraction sections 1204-1 and 1204-2, and interleaving sections 1205-1 and 1205-2, as shown in FIG. 12. There may be a configuration in which the likelihood information output from the equalization section 1201-1, which equalizes the received signal of the antenna 1, is input into the decoding section 1203-1 via the de-interleaving section 1202-1 and the likelihood information output from the decoding section 1203-1 is input into the equalization section 1201-2, which equalizes the receiving signal at the antenna 2, via the interleaving section 1205-1.

As described above, the third embodiment not only exchanges the coding bit LLR for each of the antennas after the equalization within the equalization section but also exchanges the bit LLR including the bit LLR output from the decoding section, and thereby can improve the receiving antenna diversity effect and the decoding effect.

DESCRIPTION OF THE REFERENCE SYMBOLS

100 Transmitter
101 Coding section
102 Interleaving section
103 Modulation section
104 Frame forming section
105 Pilot generation section
106 DA conversion section
107 Radio transmission section
108 Transmission antenna section
300 Receiver
301-1 to 301-M Antenna section
302-1 to 302-M Radio receiving section
303-1 to 303-M AD conversion section
304-1 to 304-M Pilot separation section
305 Channel estimation section
306 Reception processing section
307 Data decision section
401 Signal detection section
402 De-interleaving section
403 Decoding section
501-1 and 501-2 Equalization section
502-1 and 502-2 Subtraction section
555 Signal detection section
601 Symbol replica generation section 602 Interference replica generation section
603 Weight generation section
604 Subtraction section
605 Channel compensation section
606 LLR calculation section
607 PS conversion section
701 Equalization order determination section
702-1 to 701-M' Equalization section
703-1 to 703-M' Subtraction section
901 Signal detection section
902 Subtraction section
903 De-interleaving section
904 Decoding section
905 Subtraction section
906 Interleaving section
1001-1 and 1001-2 Switching section
1002-1 and 1002-2 Equalization section
1003-1 and 1003-2 Subtraction section

The invention claimed is:

1. A receiving apparatus which receives radio signals using a plurality of antennas, said apparatus comprising:
   a pilot separation section separating a pilot signal and a received data signal from said radio signals;
   a channel estimation section calculating a channel estimation value corresponding to each of said antennas according to said pilot signal; and
   a reception processing section performing signal detection for the received data signal corresponding to each of said antennas and having a plurality of equalization sections each generating likelihood information according to the received data signal and the channel estimation value, wherein
   any one of the equalization sections generates likelihood information using the likelihood information generated by another equalization section and also outputs said generated likelihood information to another equalization section.

2. The receiving apparatus according to claim 1, wherein said reception processing section comprises a first subtraction section subtracting the likelihood information generated by another equalization section from the likelihood information output from said any one of the equalization sections.

3. The receiving apparatus according to claim 1, wherein said reception processing section comprises a first decoding section performing decoding processing using the likelihood information output from any one of the equalization sections and outputting the decoded likelihood information.

4. The receiving apparatus according to claim 1, wherein each of said equalization sections comprising:
   an interference replica generation section generating an interference replica using the received data signal corresponding to each of said antennas, said channel estimation value, and the likelihood information generated by another equalization section; and
   an interference elimination section subtracting said interference replica from the received data signal corresponding to each of said antennas.

5. The receiving apparatus according to claim 1, wherein any one of said equalization sections performs processing of generating likelihood information using the likelihood information generated by another equalization section and outputting said generated likelihood information to another equalization section, at least once.

6. The receiving apparatus according to claim 1, wherein said reception processing section further comprises an equalization order determination section measuring received quality of each of the received data signals according to the channel estimation value corresponding to each of said antennas, and performing selection of the received data signals to be subjected to signal detection and ordering of the received data signals to be subjected to signal detection.

7. The receiving apparatus according to claim 1, wherein said reception processing section further includes a first decoding section performing decoding processing using the likelihood information output from any one of the equalization sections and outputting the decoded likelihood information; and
   said equalization section generates likelihood information using the likelihood information output from said first decoding section and also outputs said generated likelihood information to said first decoding section.

8. The receiving apparatus according to claim 2, wherein said reception processing section comprises a first decoding section performing decoding processing using the likelihood information output from any one of the equalization sections and outputting the decoded likelihood information.

9. The receiving apparatus according to claim 5, wherein the number of times for any one of said equalization sections to perform the processing of generating likelihood information using the likelihood information generated by another equalization section and outputting said generated likelihood information to another equalization section, is determined according to Quality of Service (QoS).

10. The receiving apparatus according to claim 6, wherein said equalization order determination section changes the number of the received data signals to be selected and the order of the received data signals to be subjected to signal detection, every time any one of said equalization sections repeats the processing of generating likelihood information using the likelihood information generated by another equalization section and outputting said generated likelihood information to another equalization section.

11. The receiving apparatus according to claim 7, wherein said reception processing section still further includes a switching section selecting and outputting either one of the likelihood information output from said another equalization section and the likelihood information output from said first decoding section.

12. A communication system which performs radio communication between a transmission apparatus and a receiving apparatus having a plurality of antennas, wherein
   said receiving apparatus includes:
   a pilot separation section separating a pilot signal and a received data signal from radio signals received from said transmission apparatus using said plurality of antennas;
   a channel estimation section calculating a channel estimation value corresponding to each of said antennas according to said pilot signal; and
   a reception processing section performing signal detection for the received data signal corresponding to each of said antennas and having a plurality of equalization sections each generating likelihood information according to the received data signal and the channel estimation value; and any one of the equalization sections generates likelihood information using the likelihood infoimation generated by another equalization section and also outputs said generated likelihood information to another equalization section.

* * * * *